United States Patent [19]
Bernard et al.

[11] Patent Number: 6,102,317
[45] Date of Patent: Aug. 15, 2000

[54] WATERPROOF REEL

[75] Inventors: Jean Bernard, Scionzier; Alain Plestan, Marignier, both of France

[73] Assignee: Mitchell Sports, Marignier, France

[21] Appl. No.: 09/024,022

[22] Filed: Feb. 16, 1998

[30] Foreign Application Priority Data

Feb. 17, 1997 [FR] France .................................. 97 02135

[51] Int. Cl.$^7$ .................................................. A01K 89/00
[52] U.S. Cl. ........................ 242/319; 242/311; 242/316
[58] Field of Search ................................... 242/224, 283, 242/310, 311, 312, 316, 319, 323, 231; 200/293, 302.1, 302.2, 302.3; D22/140, 141

[56] References Cited

U.S. PATENT DOCUMENTS

| | | | |
|---|---|---|---|
| 2,132,627 | 10/1938 | Jackson | 200/293 |
| 2,343,060 | 2/1944 | Horning | 200/302.2 X |
| 2,440,943 | 5/1948 | Gonsett et al. | 200/302.3 X |
| 2,586,170 | 2/1952 | Lawrenz | 242/224 X |
| 2,795,144 | 6/1957 | Morse | 200/302.3 X |
| 3,049,602 | 8/1962 | Flatt et al. | 200/302.2 X |
| 3,089,009 | 5/1963 | Korsgren, Sr. | 200/302.3 X |
| 3,272,952 | 9/1966 | McKeon | 200/293 |
| 3,821,531 | 6/1974 | Halbach et al. | 200/302.2 X |
| 4,813,629 | 3/1989 | Hashimoto et al. . | |
| 4,830,306 | 5/1989 | Tsunoda et al. | 242/316 |
| 4,852,826 | 8/1989 | Sato . | |
| 4,911,378 | 3/1990 | Hitomi . | |
| 5,021,638 | 6/1991 | Nopper et al. | 200/302.2 X |
| 5,023,413 | 6/1991 | Staples | 200/295 |
| 5,149,008 | 9/1992 | Oi | 242/319 X |
| 5,156,351 | 10/1992 | Cittadini . | |
| 5,203,104 | 4/1993 | Brauer . | |
| 5,328,127 | 7/1994 | Yoshikawa . | |
| 5,443,571 | 8/1995 | Kang | 242/311 |
| 5,448,028 | 9/1995 | Filion et al. | 200/302.1 X |
| 5,560,561 | 10/1996 | Henriksson | 242/231 |
| 5,725,086 | 3/1998 | Cooper | 200/302.3 |
| 5,769,344 | 6/1998 | Kaneko et al. | 242/231 |
| 5,788,059 | 8/1998 | Jahangiri | 200/302.3 |
| 5,845,858 | 12/1998 | Amano et al. | 242/231 |

FOREIGN PATENT DOCUMENTS 2701812 2/1993 France .

Primary Examiner—Donald P. Walsh
Assistant Examiner—Emmanuel M. Marcelo
Attorney, Agent, or Firm—Foley & Lardner

[57] ABSTRACT

A fishing reel comprises a rigid housing, made from the assembly of several parts, and covered with a waterproof flexible casing, except for the openings for access for mechanical parts and the foot. A cover pinches the casing around the front opening for access for the main reel shaft. The foot pinches the casing around a fastening tenon for the foot. Some plugs ensure waterproofing by pinching the casing around the openings for access for the crank shaft. Therefore, the housing provides effective waterproofing by protecting the gear mechanism in the cavity of the housing.

42 Claims, 7 Drawing Sheets

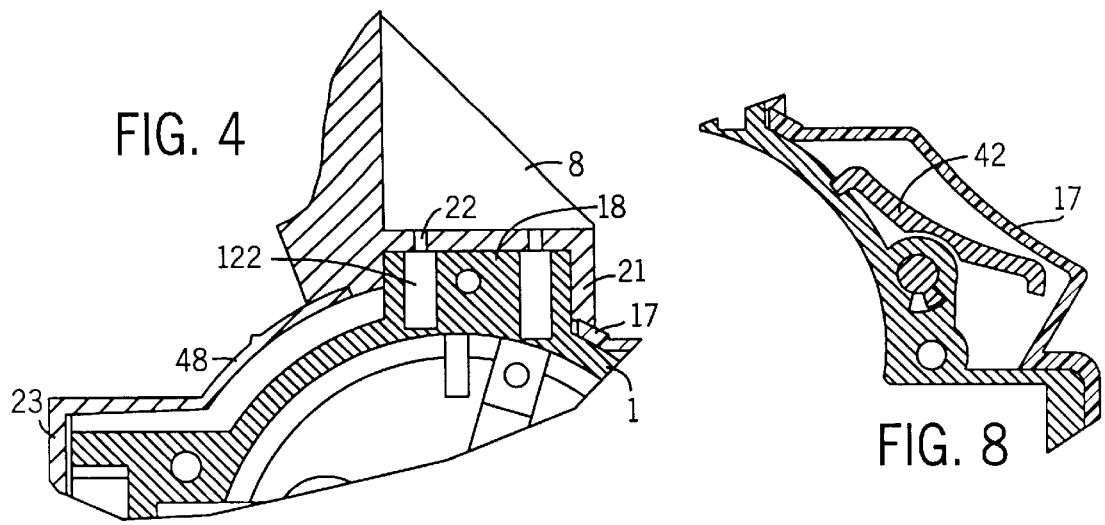
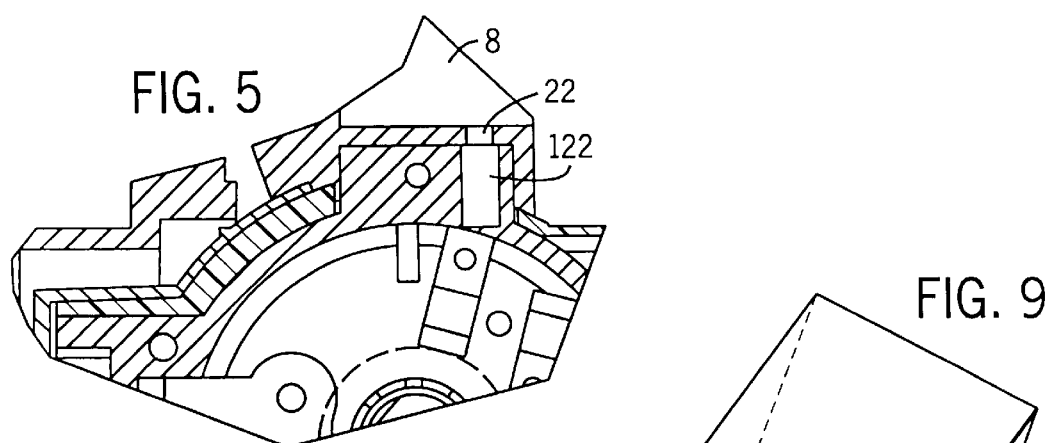
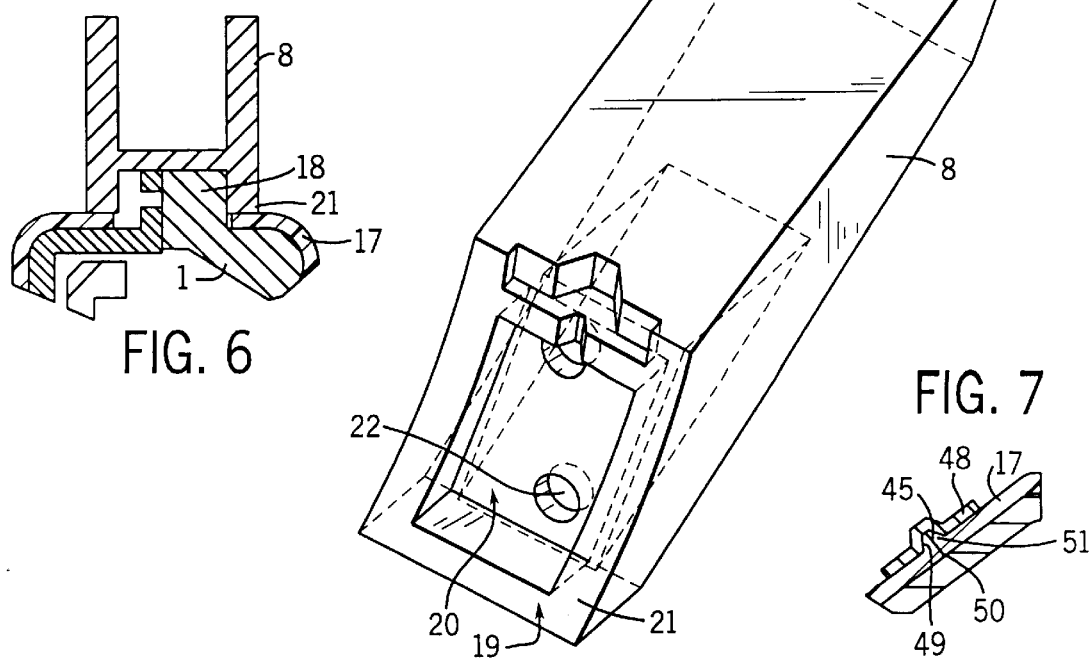

WATERPROOF REEL

BACKGROUND OF THE INVENTION

This invention pertains to fishing reels with a fixed axial spool and a rotary line pick up.

Inside these standard fishing reels a housing with a rigid side encloses a cavity in which an inside gear mechanism is lodged. The side of the housing is attached, through an upper connecting area, to a fastening foot on a fishing rod. The housing has two opposite lateral openings for access for the shaft of the crank handle that controls the inside gear mechanism. In addition, the housing includes a front opening for access for the longitudinal hollow shaft that supports the line pick up drum. The longitudinal hollow shaft that supports the line pick up drum rotates and is supported in the front opening of the housing while moving in axial rotation by means of the inside gear mechanism. A spool that holds the reserve fishing line is supported at the end of a spool support shaft that goes through the hollow longitudinal shaft. The shaft that supports the spool engages in an alternate axial movement by means of the inside gear mechanism.

During the rotation of the crank handle the inside gear mechanism converts the movement of rotation from the crank handle around its transverse axis into a movement of rotation of the line pick up drum around the longitudinal axis of the reel, and converts the movement of rotation of the crank handle around its transverse axis into an alternate axial movement of translation of the spool support shaft. Consequently, the inside gear mechanism is relatively complex, and must be protected against aggressive outside agents such as humidity and dust.

With standard reels the housing is generally made of several parts that are assembled one against the other, and the shape of the housing is relatively complex. Consequently, it is difficult to provide effective seals at all of the joining areas of the parts forming the housing, and at all of the areas where mobile mechanical elements go through, such as the crank handle shaft and the hollow longitudinal shaft for the line pick up drum. Therefore, standard reels are not sufficiently waterproof to protect against aggressive outside agents such as humidity, water and dust, without damaging the inside gear mechanism.

SUMMARY OF THE INVENTION

One objective for this invention is to provide a new reel structure with effective means to render it waterproof, compatible with the complexity of the outside shape of the reel, effectively sealing the mobile mechanical parts from the outside environment, and without disturbing the normal functioning of the reel and especially the rotation or the translation of the mobile mechanical elements.

Another objective of the invention is to provide a waterproof structure that is simple and inexpensive, while sturdy and with visual appeal.

To achieve these objectives and others, a fishing reel according to the invention includes a standard housing and a mechanism structure such as the one described above, and in addition comprises:

a waterproof flexible casing, placed on the housing to cover it entirely except for the base of the foot, the front opening and the opposite lateral openings, means for waterproofing the upper section around the base of the foot, to guarantee waterproofing between the outside environment and the space inside the casing, first means for waterproofing the lateral section to seal one of the opposite lateral openings, second means for waterproofing the lateral section to leave access for the shaft of the crank handle and to guarantee waterproofing between the outside environment and the space inside the casing, means for waterproofing the front section, designed to leave access for the hollow longitudinal shaft and to guarantee waterproofing around the hollow longitudinal shaft between the outside environment and the space inside the casing.

Besides effective waterproofing, the waterproof flexible casing, made of an elastomer, acts as a shock absorber in case the reel is dropped or in case of shocks against rocks, for example. In addition it is a sound proofing device, reducing the inevitable noise perceived from the inside mechanical system.

According to one method of implementation, the means for waterproofing the front section include a rigid cover with a center opening equipped with means for an annular seal in order for the hollow longitudinal shaft to be waterproof while in rotation, while the cover has a peripheral support area that entirely surrounds the center opening and is applied with pressure by fastening and tightening means on one part of the casing surrounding the center opening.

According to one method of implementation, the first means for waterproofing the lateral section include a blind plug having an annular rim for front support and an inside thread to screw on the corresponding outside thread from an axial shaft projecting around one of the two lateral openings on the housing, with the supporting annular rim in the front pinching part of the casing surrounding the lateral opening against the side of the housing.

According to one method of implementation, the second means for waterproofing the lateral section include a pierced plug with an axial hole provided with means for an annular seal in order for the crank shaft to be waterproof while in rotation, and with an annular rim for front support and an inside thread to screw on the corresponding outside thread from an axial shaft projecting around the other lateral opening on the housing, with the supporting annular rim in the front pinching a corresponding part of the casing surrounding the lateral opening against the side of the housing.

According to one method of implementation, the means for waterproofing the upper section include a tenon protruding on the housing, and an attached foot, the base of which is hollowed out to fit over the protruding tenon, with the peripheral lower rim of the foot pinching part of the casing surrounding the protruding tenon against the side of the housing.

The housing may include at least one swinging button to drive the inside mechanism. The button is then actuated by deformation of part of the casing with a flexible side that covers it.

Preferably, the reel additionally includes a nut screwed on an axial threaded part at one end of the hollow longitudinal shaft, with an annular joint inserted to seal around the spool support shaft and against the nut.

According to a preferable method of implementation that would simplify the adjustment of the flexible casing on the reel housing during assembly, without any risk of damaging the flexible casing, the invention provides a reel structure in which:

the flexible casing has a longitudinal slit on its upper section between a front opening used for access for the hollow longitudinal shaft and an upper opening used for access for the foot, the foot and/or the cover comprise(s) a small tongue resting on the external side of the casing around the longitudinal slit.

For a fishing reel with a front spool brake it is, in addition, suitable to protect the brake mechanism against aggression from the environment. Here, the spool includes a front brake mechanism with a stack of washers lodged inside an axial cavity in front of the spool body, with a brake activation front rotary button pushing back the stack of washers in the bottom of the front axial cavity and screwed on the end of the spool support shaft, with an annular seal inserted between the spool and the spool support shaft behind the front axial cavity, and with a sealing disk inserted on the spool support shaft in front of the front axial cavity and engaged with its circumference sliding and resting on an annular area corresponding to the spool around the front axial cavity, certain axial posts from the brake activation button go through the sealing disk in a watertight manner and rest on the stack of washers behind the sealing disk.

BRIEF DESCRIPTION OF THE DRAWINGS

Other objectives, characteristics and advantages of this invention will be elaborated in the following description for the specific methods of implementation, by referring to the appended FIGURES, in which:

FIG. 4 is a partial side view in a longitudinal section according to the median longitudinal plane 4—4 in FIG. 3;

FIG. 5 is a side view in a longitudinal section according to the longitudinal plane 5—5 in FIG. 3, shifted slightly laterally in relation to the median longitudinal plane 4—4;

FIG. 6 is a partial front view in cross section according to plane 6–6 in FIG. 2;

FIG. 7 is a partial cross section according to plane 7 in FIG. 2, showing a detail of the means used to waterproof the upper area of the housing;

FIG. 8 is a side view in longitudinal section illustrating, at a larger scale, a structure for a swinging activating button accessible through the flexible casing;

FIG. 9 is a bottom view in perspective, illustrating a structure of a reel foot according to the present invention;

DETAILED DESCRIPTION OF THE PREFERRED EMBODIMENTS

Figure 1:
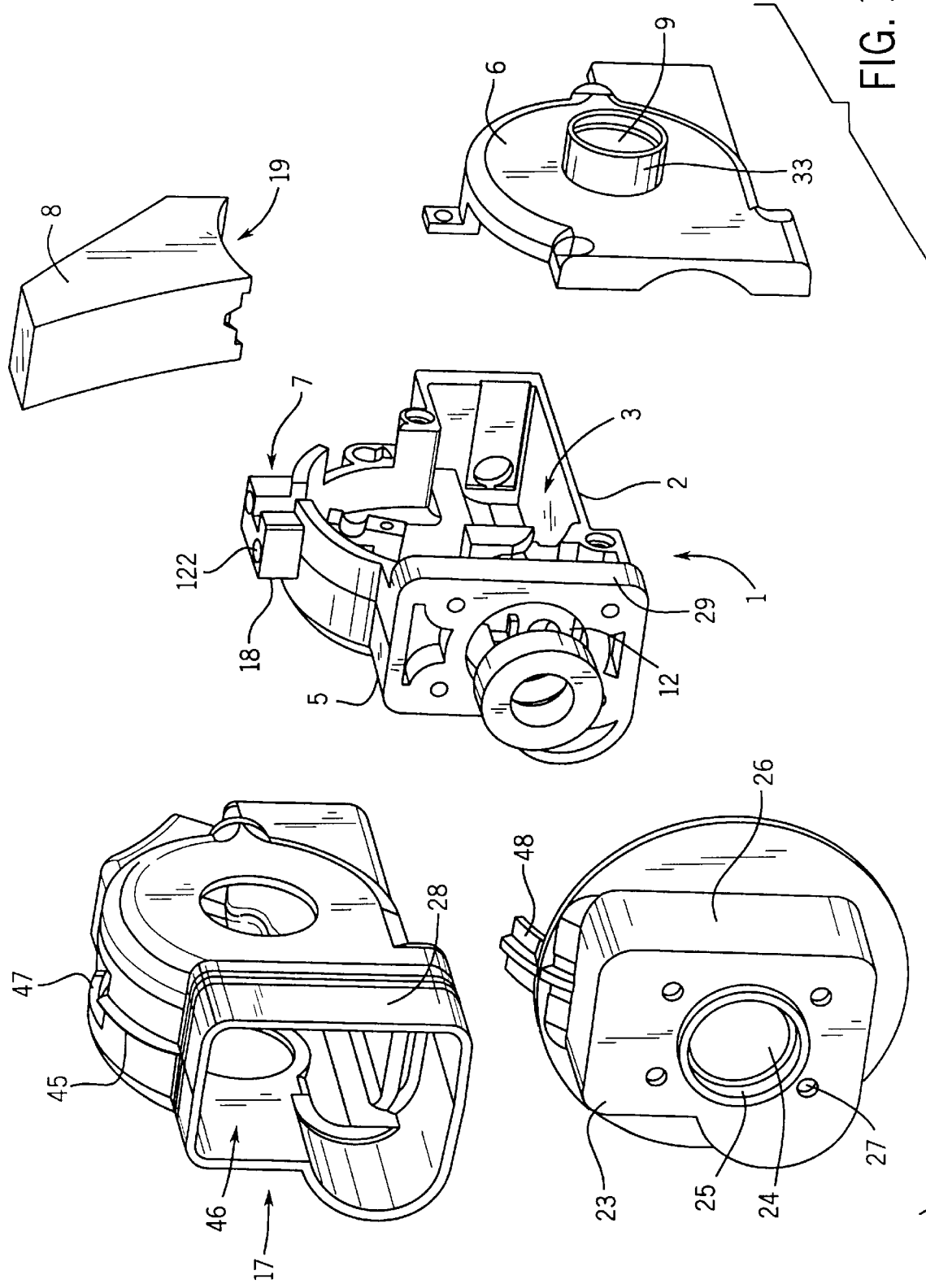
FIG. 1 represents an exploded perspective view showing the main parts to be assembled to implement the waterproof reel housing according to one method of implementation for this invention.

In the method of implementation illustrated in FIGS. 1 through 3 and 10, a fishing reel according to this invention comprises a housing (1) with a rigid side (2) surrounding a cavity (3) in which an inside gear mechanism (4) is lodged. As we can see in FIG. 1, the housing (1) is composed of the frame assembly (5) constituting the main section of the housing (1), and a frame cover (6) laterally inserted and fastened on the frame (5).

The side (2) of the housing (1) comprises an upper connecting area (7) for a fastening foot (8) on a fishing rod.

The side (2) of the housing (1) comprises two opposite lateral openings (9) and (10) for access for shaft (11) of a crank handle that controls the inside gear mechanism (4).

Side (2) of the housing (1) comprises a front opening (12) for access for a hollow longitudinal shaft (13) of a line pick up drum (14).

The line pick up drum (14) is interdependent with a hollow longitudinal shaft (13) that rotates and is supported in the front opening (12) of the housing (1) while being moved in axial rotation by the inside gear mechanism (4). Therefore, we have represented in a diagram a toothed gear (4) supported by the crank shaft (11) and engaged with a posterior end pinion provided on the hollow longitudinal shaft (13). The assembly of the line pick up drum (14) on the hollow shaft (13) is achieved for example by forcing it into place or by molding a cylindrical portion (14') of the existing drum (14) on the hollow shaft (13).

Figure 10:
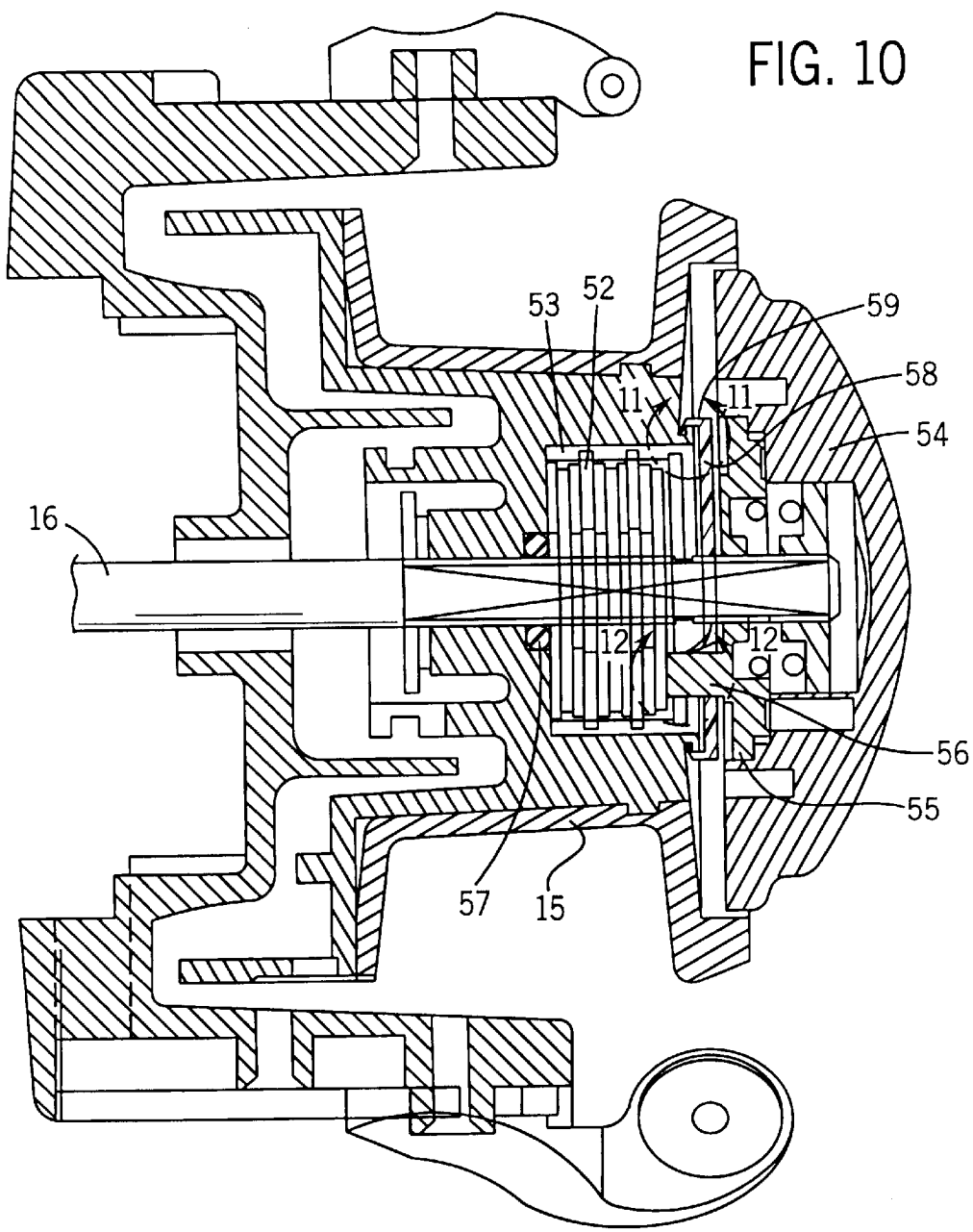
FIG. 10 is a side view in longitudinal section of a structure for a waterproof spool with front brake according to one method of implementation for this invention.

A line reserve spool (15) may be fitted at the end of the spool support shaft (16), as illustrated in FIG. 10, this spool support shaft (16) going through the hollow longitudinal shaft (13) while moved in alternate axial translation by the inside gear mechanism (4), in a standard manner that is often used in fishing reels.

The inside gear mechanism (4) may be one of many standard mechanisms that are often used in fixed spool fishing reels with line pick up.

By referring again to FIGS. 1 through 3, we notice that the reel according to the invention comprises a waterproof flexible casing (17), placed on the housing (1) to cover it entirely except for the base of the foot (8), the front opening (12) and the opposite lateral openings (9) and (10).

Means for waterproofing the upper section are placed around the base of the foot (8) to guarantee waterproofing between the outside environment and the space inside the casing (17), to, more particularly, resist humidity or dust coming from outside the housing (1). In the method of implementation illustrated in FIGS. 1, 3 and 9, the means for waterproofing the upper section include a tenon (18) protruding from the housing (1), and an attached foot (8) of which the base (19) is hollowed out, as we can better see in FIG. 9, with a cavity (20) to fit over the protruding tenon (18), with the peripheral lower rim (21) of the foot pinching part of the casing (17) surrounding the protruding tenon (18) against the side (2) of the housing (1). We can clearly see the side of the housing being pinched around the tenon (18) more particularly in FIGS. 4 through 6.

The foot (8) may be attached to the housing (1) with screws and metalloplastic washers inserted in the holes (22) of the foot (8) (FIG. 9) and in corresponding holes (22) of the tenon (18).

Figure 3:
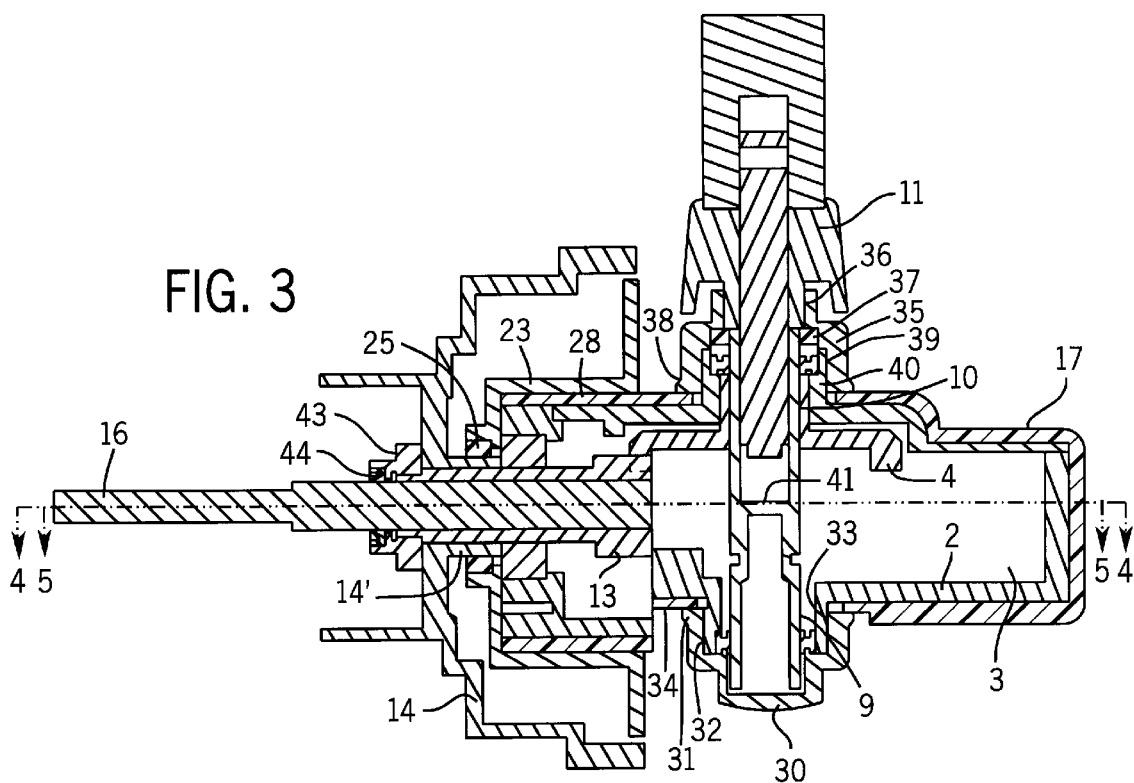
FIG. 3 is top view in a longitudinal section according to the plane 3—3 in FIG. 2.

According to the invention, the reel comprises means to waterproof the front section, designed to leave access for the hollow longitudinal shaft (13) and to guarantee the seal around the hollow longitudinal shaft (13) between the outside environment and the space inside the casing (17). In the method of implementation illustrated in the FIGURES, and particularly in FIGS. 1, 3 and 5, the means to waterproof the front section include a rigid cover (23), with a center opening (24) equipped with means for an annular seal (25) in order for the hollow longitudinal shaft (13) to be waterproof while in rotation. As illustrated in FIG. 3, the seal (25) preferably may rest against the external side of the cylindrical portion (14') of the line pick up drum (14), this external side may be made with an appropriate material to reduce friction and avoid wear of the seal (25). The cover (23) comprises a peripheral support area (26) that entirely surrounds the center opening (24) and is applied with pressure by fastening and tightening means such as screws inserted inside holes (27) on one part (28) of the casing (17) surrounding the center opening (24).

In the illustrated method of implementation, the cover (23) comprises a peripheral tubular rim with an anterior-posterior axis forming the peripheral support area (26) and facing a peripheral corresponding side (28) of the casing (17), this corresponding lateral side (28) having an anterior-posterior axis. Similarly, the housing (1) has a peripheral lateral surface (29) shaped in a similar manner, preferably in a truncated pyramid with an anterior posterior axis, in such a manner that the axial insertion of the cover (23) on the part (29) of the housing (1) causes the progressive pinching of the part (28) of the casing (17) between the cover (23) and the part (29) of the housing (1).

In addition, according to the invention, the reel comprises the first means to waterproof the lateral section to seal one of the opposite lateral openings (9) and (10) of the housing (1). In the method of implementation illustrated in FIG. 3, the first means to waterproof the lateral section include a blind plug (30) with a front support annular rim (31) and an inside thread (32) to screw on the corresponding outside thread from an axial shaft (33) projecting around one or the other opposite lateral openings (9) and (10) on the housing (1).

In the assembled position illustrated in FIG. 3, the front support annular rim (31) of the blind plug (30) pinches part (34) of the casing (17) surrounding the lateral opening (9) or (10) against the side (2) of the housing (1).

In addition, the reel comprises the second means to waterproof the lateral section to leave access for the shaft (11) of the crank handle and to guarantee waterproofing between the outside environment and the space inside the casing (17). In the method of implementation illustrated, as we can better see in FIG. 3, the second means to waterproof the lateral section include a pierced plug (35) with an axial hole (36) equipped with the means for an annular seal (37) in order for the crank shaft (11) to be waterproof while in rotation. The pierced plug (35) has a front support annular rim (38) and an inside thread (39) to screw on the corresponding outside thread from an axial shaft (40) projecting around the other one of the opposite lateral openings (9) and (10) of the housing (1). In the assembled position, the front support annular rim (38) pinches part of the casing (17) surrounding the lateral opening (9) or (10) against the side (2) of the housing (1).

The crank shaft (11) is preferably solid, or has a transverse wall (41) to prevent fluid from entering along the axial channel of the crank shaft (11).

Figure 2:
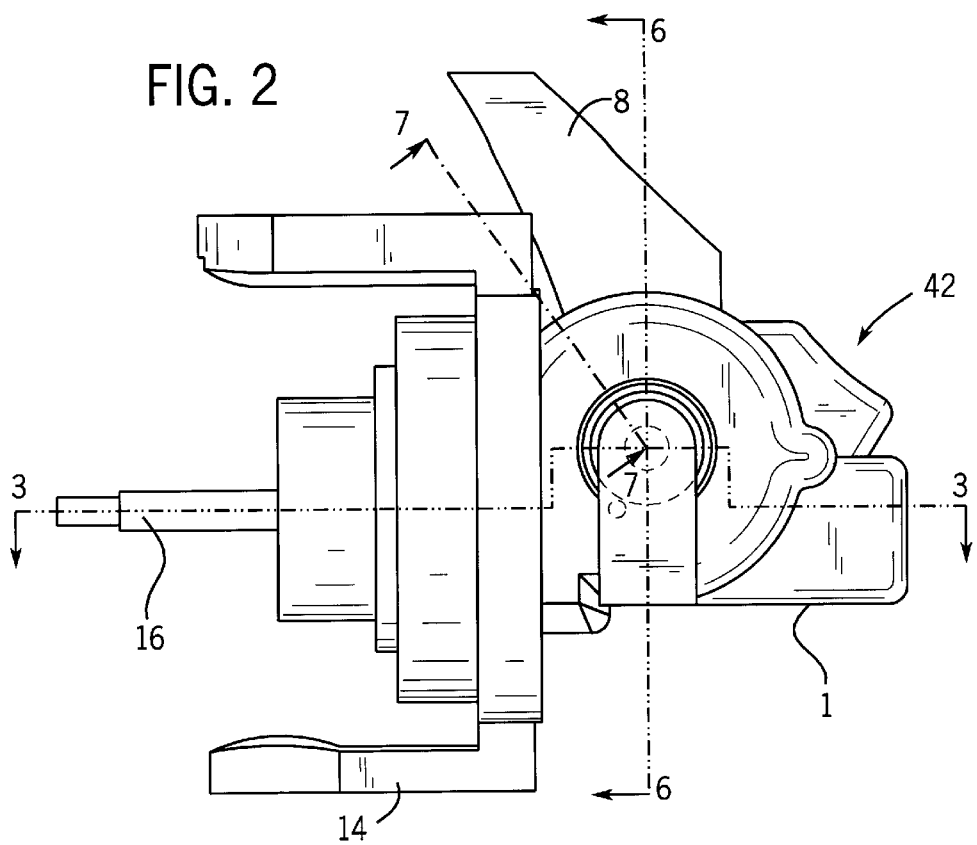
FIG. 2 is a side view of the assembled reel, without a spool.

In the method of implementation illustrated in the FIGURES and more particularly in FIGS. 2 and 8, the reel has at least one activating button (42), for example one rear swinging activating button to drive the inside gear mechanism (4). The button (42) is actuated by the user by deforming part of the flexible casing (17) that covers it.

Figure 18:
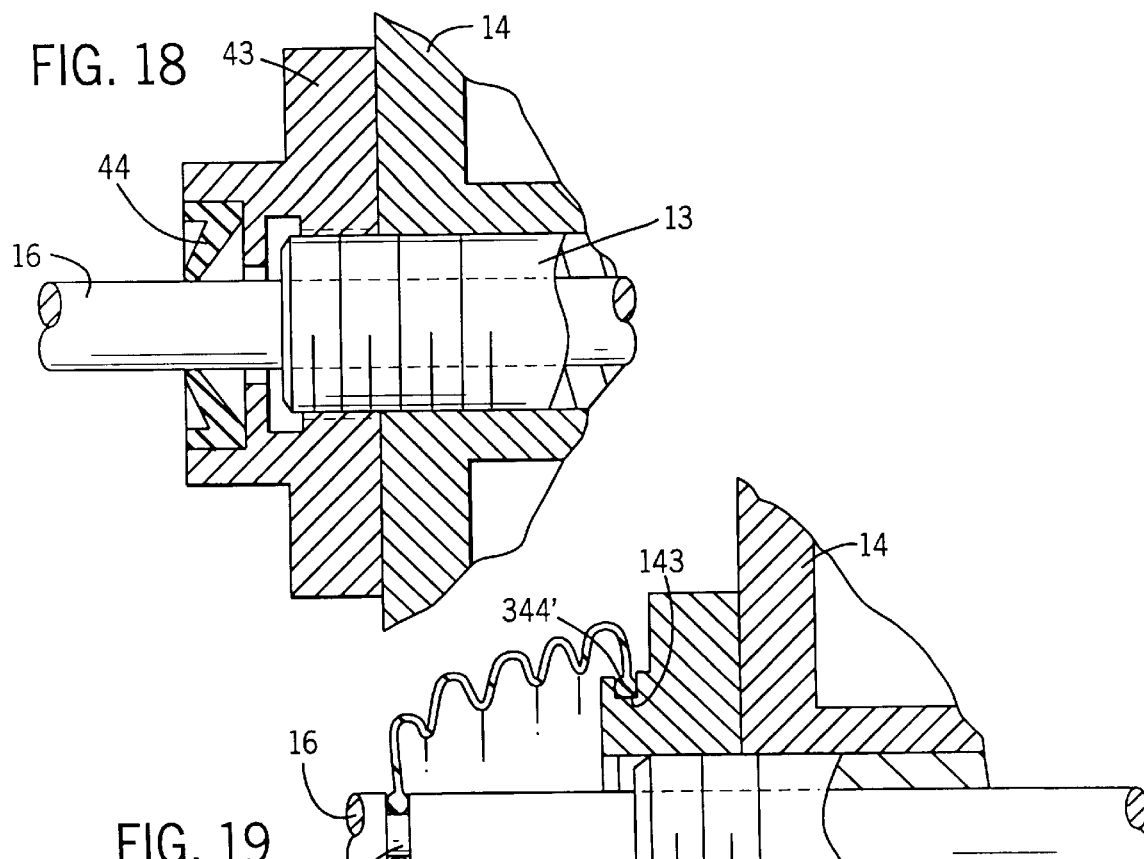
FIGS. 18 and 19 illustrate, in longitudinal section, two variants for the implementation of a seal between the spool support shaft and the drum for line pick up.

As we can see in FIG. 3, and in more detail in FIG. 18, the waterproofing between the spool support shaft (16) and the hollow longitudinal shaft (13) that goes through it may preferably be provided by a nut (43) equipped with an inside annular seal (44) and screwed on an axial threaded part at one end of the hollow longitudinal shaft (13), with the inside annular seal (44) inserted to seal around the spool support shaft (16) and against the nut (43). The annular seal (44) may preferably be a seal with a lip.

Figure 19:
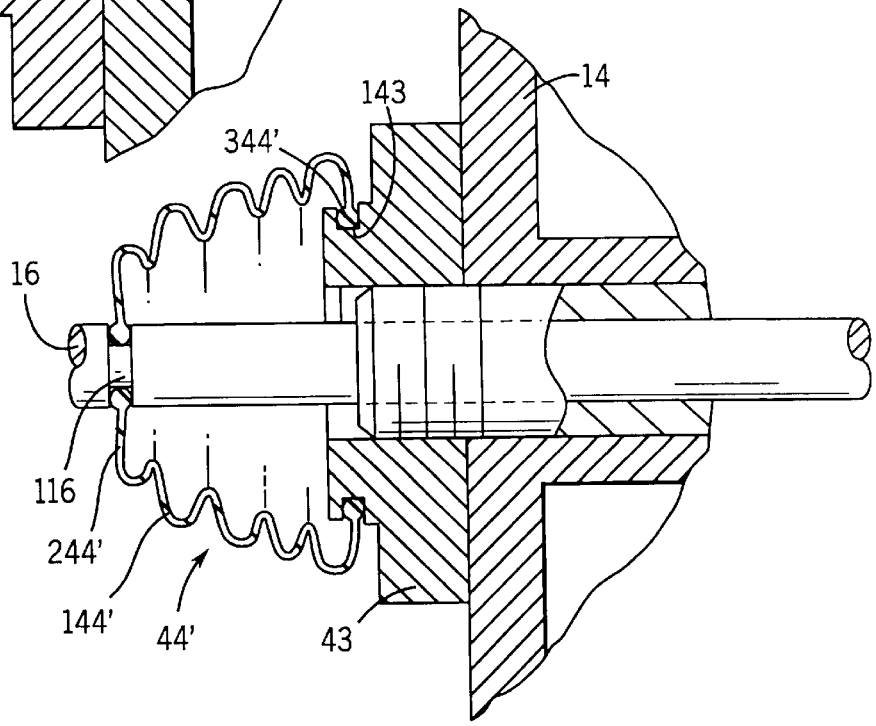

Alternately, as illustrated in FIG. 19, the waterproofing between the spool support shaft (16) and the hollow longitudinal shaft (13) may preferably be implemented by a tubular seal (44') with a lateral tubular side (144') undulated with bellows limited by two end circular lips (244') and (344') engaged in rotation and waterproof in the respective annular grooves (116) of the shaft (16) and (143) of the nut (43). In this way, we reduce the friction in the longitudinal movements of the spool support shaft (16).

In the method of implementation illustrated in FIGS. 1, 4, 5, the flexible casing (17) has a longitudinal slit (45) on its upper section between a front opening (46) for access for the hollow longitudinal shaft (13) and an upper opening (47) for access for the foot (8). Here, the foot (8) and/or the cover (23) comprise(s) a small tongue (48) resting on the external side of the casing (17) around the longitudinal slit (45). For example, as is illustrated in the FIGURES, the cover (23) preferably supports the small tongue (48).

The small tongue (48) may preferably include a longitudinal lower groove, such as the groove (49) illustrated in FIG. 7, in which two protruding flanges (50) and (51) constituting the lips of the longitudinal slit (45) of the casing (7) are inserted. Consequently, the waterproofing is reinforced.

Figure 11:
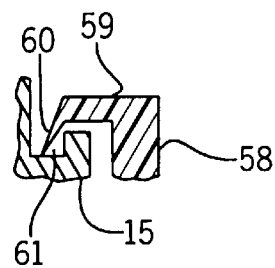
FIG. 11 illustrates the detail of the peripheral area of a waterproof disk according to the method of implementation in FIG. 10.
Figure 12:
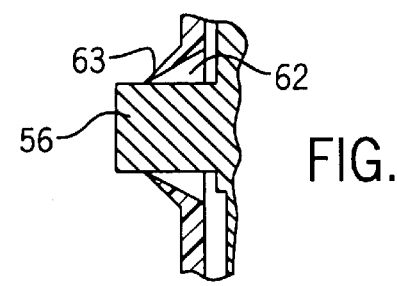
FIG. 12 illustrates in detail access for a post from a brake button through the waterproof disk in the method of implementation in FIG. 10.
Figure 16:
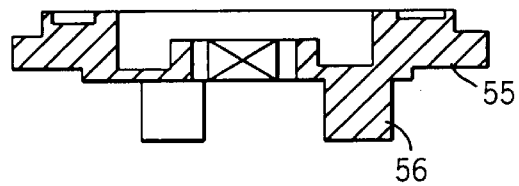
FIG. 16 is a side view in diametric section of an intermediate connecting part according to the invention between the brake activation button and the stack of brake washers.

In the implementation illustrated in FIGS. 10 through 12, the reel comprises a line reserve spool (15) with a front brake mechanism with a stack of washers (52). The stack of washers (52) is lodged in a front axial cavity (53) of the line reserve spool body (15), and a front rotary button (54) activates the brake by pushing back the stack of washers in the bottom of the front axial cavity (53). The button (54) is screwed on the end of the spool support shaft (16). An intermediate part (55) inserted on the posterior side of the button (54) includes some axial posts such as the post (56) of which the posterior end rests between the stack of washers (52). The intermediate part (55) is illustrated detached in FIG. 16.

Figure 13:
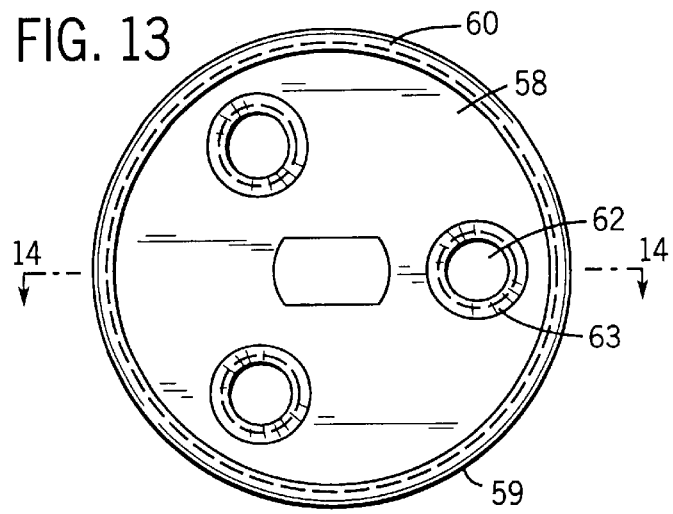
FIG. 13 is a rear view of a waterproof disk of the method of implementation in FIG. 10.
Figure 14:
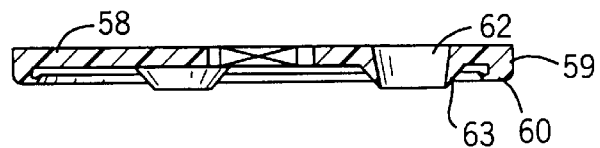
FIG. 14 is a bottom view in cross section of the waterproof disk in FIG. 13.
Figure 15:
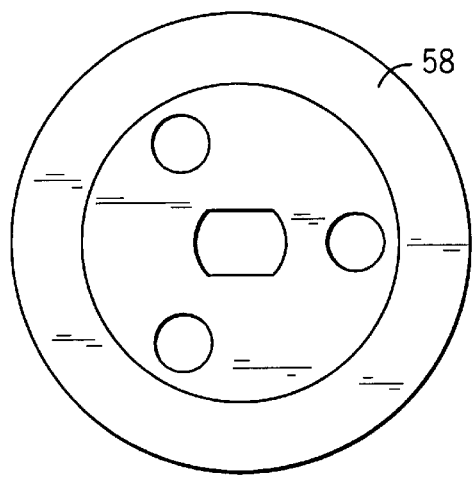
FIG. 15 is a front view of the waterproof disk in FIG. 13.

According to the illustrated method of implementation of the invention, an annular seal (57) is inserted between the line reserve spool (15) and the spool support shaft (16) behind the front axial cavity (53), and a sealing disk (58) is inserted on the spool support shaft (16) in front of the front axial cavity (53), the waterproof disk (58) is engaged with its circumference (59) sliding and resting on an annular area corresponding with the line reserve spool (15) around the front axial cavity (53). FIG. 11 illustrates the detail of the sliding support of the circumference (59) of the waterproof disk (58), with a lip (60) folded toward the back at an angle and toward the axis and resting inside a groove (61) on the body of the line reserve spool (15). FIGS. 13 through 15 illustrate the waterproof disk (58) detached, according to its two opposite sides and in a diametric section.

Certain axial posts (56) from the brake activation button (54) go through the sealing disk (58) in a watertight manner and rest on the stack of washers (52) behind the sealing disk (58). The access area for the axial posts (56) through the waterproof disk (58) is illustrated in FIG. 12, the waterproof disk has a hole (62) with a lip (63) on the circumference that is elastically flexible to insure waterproofing. The waterproofing device for the brake in front of the spool may be used regardless of this waterproof casing on the housing.

Figure 17:
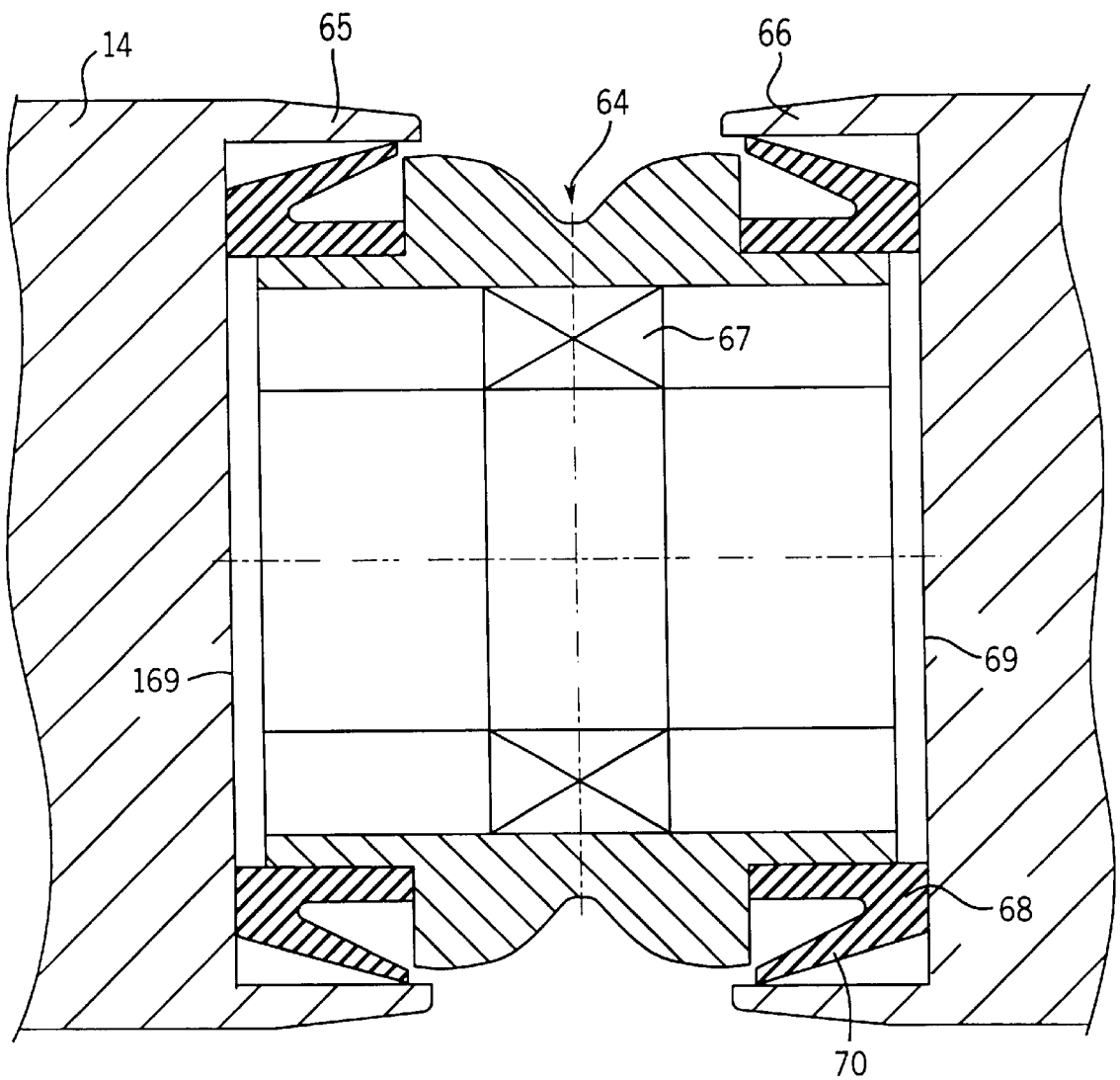
FIG. 17 is a side view in median longitudinal section of a roller for line pick up equipped with means for waterproofing according to one method of implementation for this invention.

In a standard way, according to the invention, the reel may include a rotary roller, mounted on a bail arm (14). According to the invention, we provide protection for the roller against aggressive outside agents that could trigger seizing of the roller on its axle of rotation, and would suspend any further rotation. FIG. 17 illustrates a method of implementation for the means of protection according to the invention: the roller (64) is inserted in an annular housing on the bail arm (14), this housing has lips that partly cover and opposite (65) and (66). The roller (64) is rotatively mounted with a bearing (67), with axial play between the roller (64) and the front sides (69) and (169) of the housing that supports it. An annular seal with a lip (68) is fixed on the circumference of the roller (64), and rests against the corresponding front side (69) of the bail arm (14) and at the same time against the inside of the lip (66) of the bail arm (14) with a lip that is elastically flexible (70). The elastically flexible lip (70) rests sliding on the bail arm (14), preventing any foreign matter from entering the inside of the mechanism that provides rotation to the roller (64).

Figure 20:
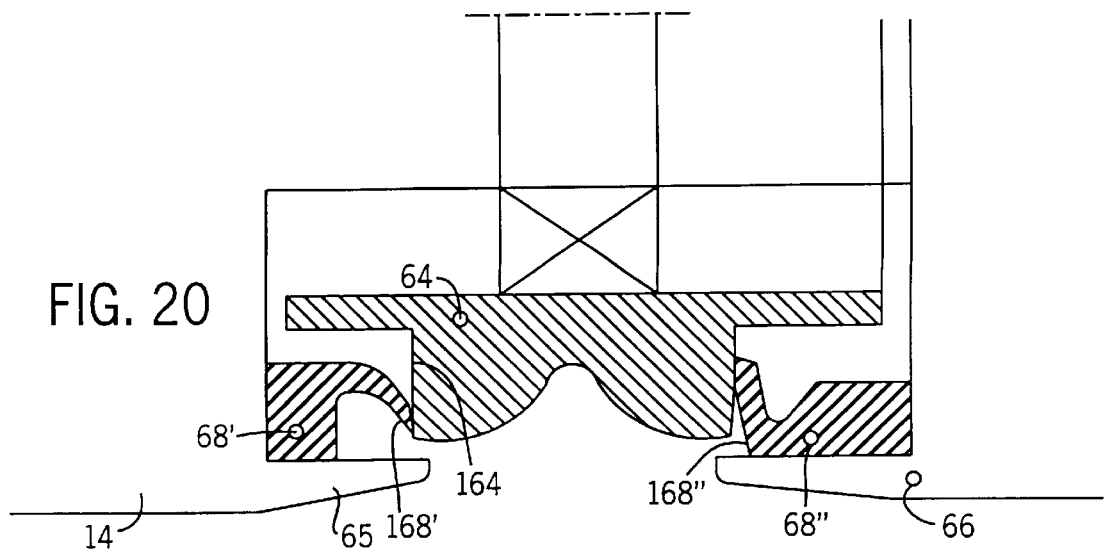
FIG. 20 is a half side view in cross section of the means to waterproof the roller for line pick up, illustrating two variants of seals according to the invention.

In another method of implementing the means to protect the roller (64), such as illustrated in FIG. 20, each annular seal with a lip (68) is replaced by an annular seal with a lip (68') fixed in the bail arm (14) under a corresponding lip of this arm (65), with a seal lip (168') elastically compressed against an end side (164) of the roller (64) and positioned at an angle toward the outside.

The FIG. 20 illustrates a variant in which the annular seal with a lip (68') is positioned as the seal (68'), under a lip from the bail arm (66), but with a seal lip (168') positioned at an angle toward the outside. The protection device for the roller may be used regardless of this waterproof casing on the housing or means to waterproof the front brake.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

This invention is not limited to the methods of implementation that have been explicitly described, but it includes the various variants and generalizations contained in the following claims.

What is claimed is:

1. A fishing reel comprising:
a housing with a rigid side, the side defining a cavity in which an inside gear mechanism is lodged, the housing with an upper section, a first lateral section, a second lateral section, and a front section, the upper section having an upper connecting area, the first and second lateral sections having a first and second lateral openings, respectively, wherein the first and second lateral openings leave access for a shaft of a crank handle that controls the inside gear mechanism, the first lateral opening being positioned opposite the second lateral opening, and the housing with a front opening;
a fastening foot configured to attach the reel to a fishing rod, the foot having a base attached to the upper connecting area of the upper section;
a line pick up drum used for line pick up, the drum with a hollow longitudinal shaft engaged in rotation therewith and supported in the front opening of the housing while being moved in rotation by the inside gear mechanism, the front section configured to allow access to the hollow longitudinal shaft and the drum;
a spool supported at the end of a spool support shaft, the spool support shaft extending through the hollow longitudinal shaft, wherein the support shaft and the spool are axially reciprocated by the inside gear mechanism;
a waterproof flexible casing configured to surround the housing, wherein the housing is inserted into the casing, and the casing covers the housing entirely except for the upper section, the front opening, and the first and second lateral openings;
means for waterproofing the upper section around where the upper connecting area attaches to the base of the foot, the means for waterproofing the upper section configured to waterproof a space inside the casing from an outside environment;
first means for waterproofing the first lateral section to seal the first lateral opening;
second means for waterproofing the second lateral section to leave access for the shaft of the crank handle and to seal between the outside environment and the space inside the casing; and
means for waterproofing the front section while providing access for the hollow longitudinal shaft.

2. The fishing reel of claim 1, wherein the means for waterproofing the front section include a rigid cover coupled to the section of the housing, the cover having a center opening adapted for the hollow longitudinal shaft to extend therethrough, and a peripheral support area adapted to entirely surround the center opening, the center opening including a first annular seal configured to seal about the spool support shaft, wherein the peripheral support area is configured to compress one portion of the casing against the housing to seal the casing against the housing.

3. The fishing reel of claim 2, wherein the cover comprises a peripheral tubular rim with a first anterior-posterior axis, the peripheral tubular rim forming the peripheral support area and facing a peripheral corresponding side of the casing, the peripheral corresponding side having a second anterior-posterior axis, the first anterior-posterior axis being approximately coaxial with the second anterior-posterior axis, the casing having a similar peripheral lateral surface.

4. The fishing reel of claim 1, wherein the first means for waterproofing the first lateral section include a blind plug with an annular rim for front support and an inside thread to screw on a corresponding outside thread from an axial shaft projecting around the first lateral opening and on the housing, with the annular rim in front of the blind plug pinching a part of the casing surrounding the lateral opening or against the side of the housing.

5. The fishing reel of claim 1, wherein the second means for waterproofing the second lateral section include a pierced plug with an axial hole provided with a means for an annular seal in order for the crank shaft to be waterproof while in rotation, and with an annular rim for front support and an inside thread to screw on a corresponding outside thread from an axial shaft projecting around the second lateral openings of the housing with the support annular rim in the front pinching a corresponding portion of the casing surrounding the lateral opening or against the side of the housing.

6. The fishing reel of claim 1, wherein the means for waterproofing the upper section include a tenon protruding from the housing, and the fastening foot, of which the base is hollowed out to fit over the protruding tenon, with a peripheral lower rim of the foot pinching part of the casing surrounding the protruding tenon against the side of the housing.

7. The fishing reel of claim 1, wherein the housing includes one swinging activating button to drive the inside gear mechanism actuated by the user by deforming part of the flexible casing that covers it.

8. The fishing reel of claim 1, including a nut screwed on an axial threaded part at one end of the hollow longitudinal shaft, the nut having an annular seal adapted to seal around the spool support shaft and against the nut.

9. The fishing reel of claim 1, wherein the flexible casing has a longitudinal slit on its upper section between the front opening used for access for the hollow longitudinal shaft and an upper opening used for access for the fastening foot, a small tongue extending from one of the foot and the cover, the small tongue resting on the external side of the casing around the longitudinal slit.

10. The fishing reel of claim 1, wherein the spool includes a front brake mechanism with a stack of washers lodged inside an axial cavity in front of the spool body, with a brake activation front rotary button pushing back the stack of washers toward a bottom of the front axial cavity and screwed on the end of the spool support shaft, with an annular seal inserted between the spool and the spool support shaft behind the front axial cavity, and with a sealing disk inserted on the spool support shaft in front of the front axial cavity and engaged with its circumference sliding and resting on an annular area corresponding with the spool around the front axial cavity, certain axial posts from the brake activation button go through the sealing disk in a watertight manner and resting on the stack of washers behind the sealing disk.

11. The fishing reel of claim 1, further comprising a nut and a tubular seal, the tubular seal having a lateral tubular side, a first tubular lip, and a second tubular lip, the hollow longitudinal shaft having an axial threaded part, wherein the nut screws on the axial threaded part and the first and second tubular lips sealably engage first and second annular grooves in the spool support shaft and the nut, respectively, to seal between the spool support shaft and the hollow longitudinal shaft.

12. A fishing reel comprising:
a housing including a rigid side defining a cavity, an upper section configured to attach to a fishing rod, a front section having a front opening, and a first lateral section having a first lateral opening;
a gear mechanism at least partially disposed within the cavity;
a crank handle having a shaft extending through the first lateral opening and operably coupled to the gear mechanism;
a line pick up drum operably coupled to the gear mechanism and rotatably supported by the housing;
a spool support shaft extending through the front opening and operably coupled to the gear mechanism to reciprocate along an axis;
a spool supported by the spool support shaft;
a flexible casing extending adjacent the housing; and
at least one component pinching the casing against the housing to form a seal.

13. The fishing reel of claim 12, further comprising a tenon extending from the upper section, and wherein the at least one component includes a fastening foot adapted to attach the reel to a fishing rod, the foot having a lower rim and a cavity formed therein, wherein the cavity receives the tenon and wherein the lower rim of the foot compresses the casing against the housing to form a seal.

14. The fishing reel of claim 13, wherein the flexible casing has an upper section extending between the front opening and the tenon, the upper section having a slit and terminating at an upper opening, wherein the tenon extends through the upper opening and wherein one of the foot and the cover includes a small tongue engaging an external side of the casing proximate the slit.

15. The fishing reel of claim 12 including an outwardly threaded axial shaft projecting around the first lateral opening and wherein the at least one component includes a pierced plug adapted to seal the first lateral section, the pierced plug having an axial hole through which the crank shaft extends, an annular rim, and an inside thread, the reel further including an annular seal between the plug and the crank shaft to waterproof the crank shaft, the inside thread configured to threadably engage the corresponding outside thread of the axial shaft of the first lateral opening, wherein the annular rim of the pierced plug compresses the casing surrounding the first lateral opening against the housing.

16. The fishing reel of claim 12, further including a second lateral section, the second lateral section having a second lateral opening, the second lateral opening being positioned opposite the first lateral opening, the second lateral opening having an outwardly threaded axial shaft projecting around the second lateral opening, and wherein the at least one component includes a blind plug adapted to seal the second lateral section, the blind plug having an annular rim and an inside thread, the inside thread threadably engaging the threaded axial shaft, wherein the annular rim of the blind plug compresses the casing surrounding the second lateral opening against the housing.

17. The fishing reel of claim 12, wherein the at least one component includes a rigid cover coupled to the front section of the housing, the cover having a center opening through which the spool support shaft extends and a peripheral support area adapted to surround the center opening, the reel including an annular seal adjacent the center opening between the peripheral support area and the spool support shaft, the casing including a corresponding peripheral side, the housing including a corresponding peripheral lateral surface, wherein the peripheral support area of the cover is configured to seal the front section by compressing the corresponding peripheral side of the casing against the corresponding peripheral lateral surface.

18. The fishing reel of claim 17, wherein the cover comprises a peripheral tubular rim with a first anterior-posterior axis, the peripheral tubular rim forming the peripheral support area and facing the peripheral corresponding side of the casing, the peripheral corresponding side having a second anterior-posterior axis, wherein the first anterior-posterior axis extends approximately coaxial with the second anterior-posterior axis.

19. The fishing reel of claim 17 including a hollow shaft extending through the center opening, where the spool support shaft extends through the hollow shaft and wherein the annular seal extends between the peripheral support area of the cover and the hollow support shaft.

20. The fishing reel of claim 19 wherein the hollow shaft is operably coupled to the gear mechanism and supports the line pick up drum.

21. The fishing reel of claim 20 including a seal assembly between the spool support shaft and the hollow shaft.

22. The fishing reel of claim 21, wherein the seal assembly comprises a nut screwed on an axial threaded part of the hollow shaft, the nut having an annular seal to seal around the spool support shaft.

23. The fishing reel of claim 21, wherein the seal assembly includes a nut and a tubular seal, the tubular seal having a lateral tubular side, a first end tubular lip, and a second end tubular lip, the hollow shaft having an axial threaded part, wherein the nut screws on the axial threaded part and the first and second tubular lips sealably engage first and second annular grooves in the spool support shaft and the nut, respectively, to waterproof between the spool support shaft and the hollow shaft.

24. The fishing reel of claim 12, including:
a bail arm coupled to the line pick up drum;
a roller rotatably mounted on the bail arm; and
an annular seal configured to seal between the bail arm and the roller.

25. The fishing reel of claim 24, wherein the annular seal is coupled to the roller, the annular seal having a lip configured to seal against the bail arm.

26. The fishing reel of claim 24, wherein the annular seal is coupled to the bail arm, the annular seal having a lip configured to seal against the roller.

27. The fishing reel of claim 24, wherein the bail arm has lips configured to at least partially cover the seal.

28. The fishing reel of claim 24, wherein the roller is mounted to a bearing, the bearing rotatably mounted to the bail arm.

29. The fishing reel of claim 12, wherein the housing includes a moveable activating button to drive the inside gear mechanism and wherein the flexible casing extends over and covers the button the seal about the button, whereby the button is actuated by deforming the flexible casing, adjacent thereto.

30. A fishing reel comprising:
a housing including a rigid side defining a cavity, an upper section configured to attach to a fishing rod, a front section having a front opening, and a first lateral section having a first lateral opening;
a gear mechanism at least partially disposed within the cavity;
a crank handle having a shaft extending through the first lateral opening and operably coupled to the gear mechanism;
a line pick up drum operably coupled to the gear mechanism and rotatably supported by the housing in the front opening of the housing;
a spool support shaft extending through the front opening and operably coupled to the gear mechanism to reciprocate along an axis;
a spool supported by the spool support shaft; and
a seal between the spool support shaft and the front section.

31. The fishing reel of claim 30 including a hollow shaft projecting from the front opening, wherein the spool support shaft extends through the hollow shaft and wherein the seal comprises a nut screwed on the hollow shaft, the nut having an annular seal to seal around the spool support shaft.

32. The fishing reel of claim 30, wherein the seal comprises a bellows.

33. The fishing reel of claim 32 including a hollow shaft projecting from the front opening, wherein the spool support shaft extends through the hollow shaft and wherein the bellows has a first end sealably coupled to the hollow shaft and a second end sealably coupled to the spool support.

34. The fishing reel of claim 32, wherein the first end of the bellows has a first end tubular lip and wherein the second end of the bellows has a second end tubular lip and wherein the reel further includes a nut threadably engaging the hollow shaft, the nut including a first annular groove receiving the first end tubular lip and wherein the spool support shaft includes a second annular groove receiving the second end tubular lip.

35. The fishing reel of claim 34, wherein the brake mechanism comprises at least one hub washer non-rotatably coupled to the hub and at least one spool washer non-rotatably coupled to the spool support shaft and wherein the brake activating button compresses the at least one hub washer and the at least one spool washer against one another with varying degrees of force.

36. The fishing reel of claim 35, wherein the brake activating button includes an axial post extending through the sealing disk against one of the hub washer and the spool washer and wherein the disk includes an elastically flexible lip biased into sealing engagement with the axial post about the axial post.

37. A fishing reel comprising:
a housing including a rigid side defining a cavity, a front section having a front opening, and a lateral section having a lateral opening;
a gear mechanism at least partially disposed within the cavity;
a crank handle having a shaft extending through the lateral opening and operably coupled to the gear mechanism;
a line pick up d m operably coupled to the gear mechanism and rotatably supported by the housing in the front opening of the housing;
a spool support shaft extending through the front opening and operably coupled to the gear mechanism to reciprocate along an axis;
a spool supported by the spool support shaft;
a hub extending a out the spool support shaft, the hub including an inner cavity about the spool support shaft;
a brake mechanism within the inner cavity of the hub;
a brake activating button coupled to the spool support shaft and operably coupled to the brake mechanism; and
a sealing disk extending about the spool support shaft at least partially between the brake activating button and the brake mechanism, the disk having an outer perimeter sealed against the hub.

38. A fishing reel comprising:
a housing including a rigid side defining a cavity, an upper section configured to attach to a fishing rod, a front section having a front opening, and a first lateral section having a first lateral opening;

a gear mechanism at least partially disposed within the cavity;

a crank handle having a shaft extending through the first lateral opening and operably coupled to the gear mechanism;

a line pick up drum operably coupled to the gear mechanism and rotatably supported by the housing;

a spool support shaft extending through the front opening and operably coupled to the gear mechanism to reciprocate along an axis;

a spool supported by the spool support shaft;

a bail arm couples to the line pick up drum;

a roller rotatably mounted on the bail arm; and a seal coupled to a first one of the roller and the bail arm, the seal having a lip configured to seal against a second one of the bail arm and the roller.

39. The fishing reel of claim 38, wherein the seal is coupled to the roller, the seal having a lip configured to seal against the bail arm.

40. The fishing reel of claim 38, wherein the seal is coupled to the bail arm, the seal having a lip configured to seal against the roller.

41. The fishing reel of claim 38, wherein the bail arm has lips configured to partly cover the seal.

42. The fishing reel of claim 38, wherein the roller is mounted to a bearing, the bearing rotatably mounted to the bail arm.

* * * * *